(No Model.)
D. A. FISKE.
CHURN.
No. 497,643. Patented May 16, 1893.
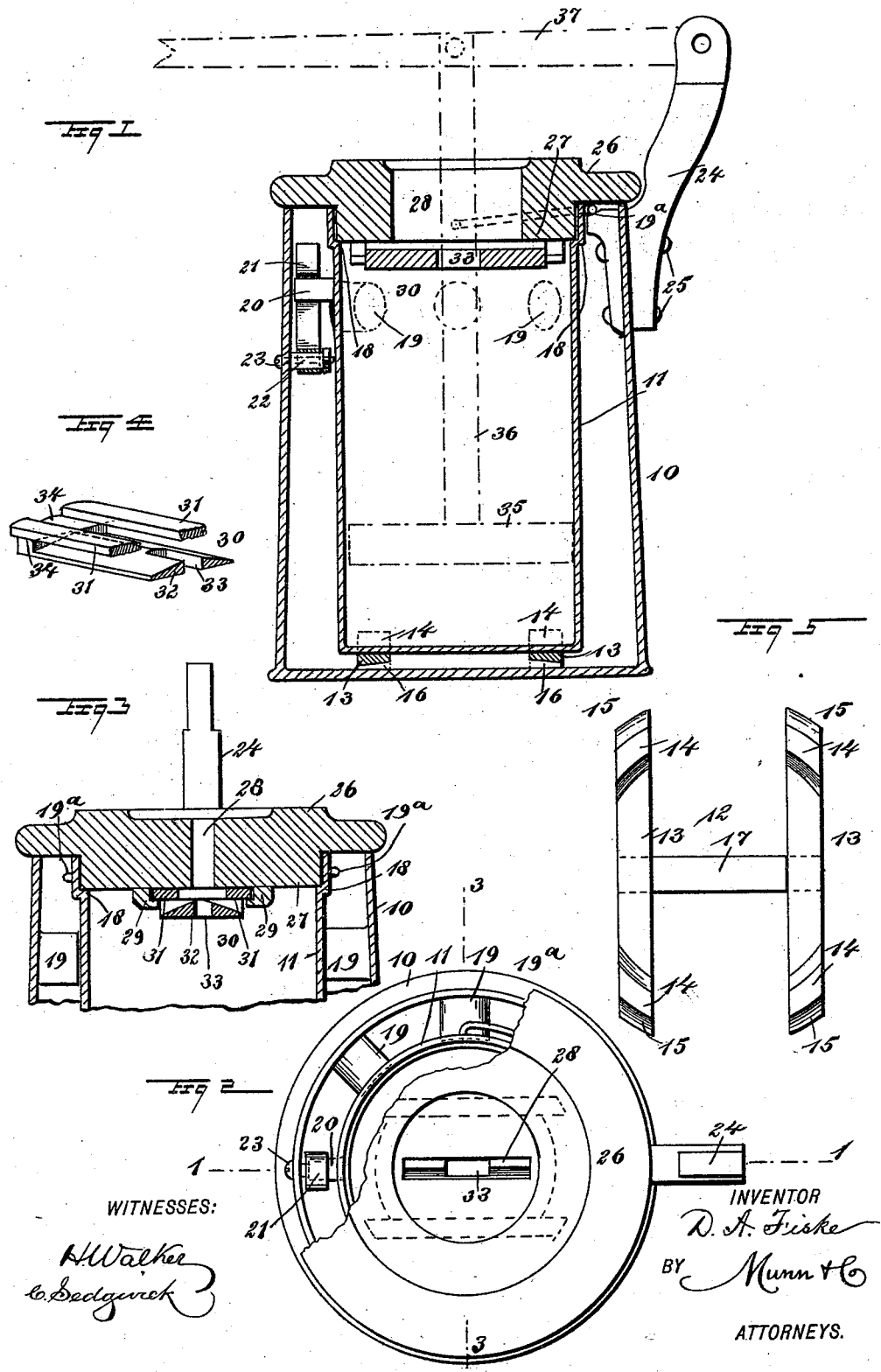
WITNESSES:
H. Walker
C. Sedgwick
INVENTOR
D. A. Fiske
BY Munn & Co
ATTORNEYS.

UNITED STATES PATENT OFFICE.

DANIEL A. FISKE, OF SIOUX CITY, IOWA.

CHURN.

SPECIFICATION forming part of Letters Patent No. 497,643, dated May 16, 1893.

Application filed September 23, 1892. Serial No. 446,651. (No model.)

*To all whom it may concern:*

Be it known that I, DANIEL A. FISKE, of Sioux City, in the county of Woodbury and State of Iowa, have invented a new and Improved Churn, of which the following is a full, clear, and exact description.

My invention relates to improvements in dasher churns.

It is well understood that to get the best conditions in making butter, it is necessary to admit air to the cream while it is being churned and also to keep the cream at a proper temperature.

The object of my invention is to produce a churn which is constructed in such a way that the conditions referred to may be easily maintained and also to produce a churn which may be conveniently operated and easily cleaned.

To these ends, my invention consists in a churn, the construction of which will be hereinafter described and claimed.

Reference is to be had to the accompanying drawings forming a part of this specification, in which similar figures of reference indicate corresponding parts in all the views.

Figure 1 is a central vertical section of the churn on the line 1—1 in Fig. 2, the dasher and operating lever being shown in dotted lines. Fig. 2 is a broken plan of the churn. Fig. 3 is a cross section of the top portion of the churn on the line 3—3 in Fig. 2. Fig. 4 is a broken perspective view of the slide and deflector which is attached to the churn cover; and Fig. 5 is a plan view of the holder in which the cream pot of the churn is placed.

The churn comprises two concentric bodies 10 and 11, the outer body 10 constituting the case of the churn and being adapted to hold water by which the temperature of the cream pot is regulated, and the inner body or cream pot 11 resting within the outer body and being adapted to contain the cream. It will be seen by reference to Fig. 1, that sufficient space is left between the cream pot and the churn body or case to permit sufficient water to be inserted to maintain the requisite temperature in the cream pot.

To permit the water to flow entirely around the cream pot, and also to hold the cream pot in place, a holder 12, is used, which is shown in detail in Fig. 5. It will be noticed that the vessel 10 is larger at the bottom than at the top and this permits the holder to be readily inserted and fastened snugly in place as described below. The holder has two parallel side pieces 13, which are thickened at the ends as shown at 14, and the four thickened portions 14 are curved on their inner sides so as to fit the cream pot, and they thus serve to hold it in place. The end portions of the side pieces are also curved and beveled, as shown at 15, and they are thus enabled to fit snugly against the wall or body of the case 10. The side pieces are provided near the center and on the under side with mortises 16, which are beveled or inclined upward toward the center of the holder, and these mortises receive tenons on the cross piece or brace 17, which connects the two side pieces, the tenons being shown by dotted lines in Fig. 5. It will be seen then that the holder may be easily taken apart and inserted in or removed from the body 10, and when the side pieces are in position they are crowded firmly against the walls of the vessel or body 10, and cannot be readily displaced.

The cream pot is widened slightly at the top so as to produce an interior shoulder or flange 18 on which the middle portion of the cover of the churn is adopted to rest as described below. The upper portion of the cream pot is held against displacement by fixed abutments 19 which are secured to the inner wall of the body or case 10, and which press against the cream pot. The cream pot is held from being raised by the movement of the dasher by the mechanism shown at the left of the drawings in Fig. 1. This fastening here shown consists chiefly of a loosely extending stud 20 on the exterior of the cream pot and a spring catch 21, which is secured to the case or body 10 and is adapted to lock over the stud. The lower end of the spring catch is journaled on a sleeve 22, and the latter is secured to the wall of the case or body 10 by a screw-bolt 23. When the cream pot is in place the spring catch 21 is snapped over the stud 20, and when the cream pot is to be removed the catch is released.

At the top of the case or body 10, and on one side, is an upwardly-extending arm 24, which is clamped to the body as shown at 25, and to the upper end of which the operating lever or handle is attached as hereinafter described. The churn is provided with a cover 26, which has a thickened middle portion 27, and this part of the cover extends downward into the top of the cream pot and rests upon the shoulder 18. The cover thus serves to cover both the outer and inner vessels. The cover is provided with a vertical slot 28 in the center of which the dasher rod moves and through which air is admitted to the cream pot.

On the under side of the cover is a slideway formed between the flanges 29, and in this slideway is held the detachable slide and deflector 30, one end portion of which is shown clearly in Fig. 4. This slide has parallel slats 31 at the top, which fit and slide on the inner sides of the flanges 29, and beneath the slats is a deflector plate 32, which is arched at the center and beveled toward the edges so that the cream will run readily off and drop back from it into the cream pot, and this deflector plate is slotted in the center, as shown at 33, to permit the passage of the dasher post and is thickened at the ends, as shown at 34, to which thickened ends the slats 31 are attached. This construction permits the air to pass downward into the pot beneath the slats 31 and also between the end portions of the slats. By reference to Fig. 3, it will be noticed that the slats 31 project outward from the sides of the slide and deflector so as to rest in the flanges 29, and permit the deflector plate to slide between the flanges.

The churn is provided with a vertical reciprocating dasher 35, which is shown only in dotted lines, as any ordinary dasher may be used. The dasher post 36 extends upward through the slots 28 and 33, and is pivoted to a lever handle 37, one end of which is fastened to the arm 24. The dasher mechanism just described is of the common kind and is operated by moving it up and down.

When the churn is used, the holder 12 is placed in the bottom and the cream pot placed within it. The cream is placed in the pot and warm water is poured into the case 10, so as to surround the pot and produce the correct temperature within the body, after which the cover is applied, being slipped on over the dasher post in the usual way, and the churn is then operated in the ordinary manner by raising and lowering the handle 37 so as to reciprocate the dasher 35. It will be seen that air may pass downward into the churn through the slots 28 and 33, and also from the slot 28 downward over the sides of the deflector plate and between the ends of the slats 31. After the butter is churned the cover is removed and the cream pot also taken out, and to facilitate this operation the cream pot is provided with a suitable bail 19ª, by which it may be lifted. It will be noticed that the cream which splashes upon the cover in the usual way will not pass upward through the slot 28, as it will strike upon the slats 31, and fall back upon the deflector plate 32, and owing to the inclined sides of said plate will run back into the cream pot.

Having thus described my invention, I claim as new and desire to secure by Letters Patent—

1. A churn, comprising a casing adapted to contain water, a cream pot having an interior shoulder and supported in the casing above the bottom and away from the sides thereof, a slotted cover for closing the casing and cream pot, the central portion of the cover extending down into the cream pot, a slotted deflector sliding in guideways on the under side of the cover, and a dasher mechanism, substantially as described.

2. A churn, comprising an outer case larger at the bottom than at the top and adapted to contain water, a cream pot shaped to fit centrally within the case, a collapsible holder adapted to fit within the case bottom and secure the bottom of the cream pot, a fastening device to secure the cream pot in the case, suitable spacing abutments to hold the cream pot in the center of the case, a cover for the cream pot and case, and dasher mechanism to act within the cream pot, substantially as described.

3. In a churn, a cream pot holder formed of parallel side pieces having beveled and thickened ends, the inner sides of the thickened ends being curved, and provided with beveled mortises on their under sides, and a brace provided with tenons fitting in said mortises, substantially as described.

4. In a churn, the combination with a cream pot cover slotted and provided with guide ways on its under side, of an arched and slotted deflector provided with slats, spaced from each other and from the deflector and working in the guide ways of the cover, substantially as described.

5. In a churn, the combination, with a cream pot having a slotted cover, of a slideway produced on the cover beneath the slot, the slide and deflector plate carried by the slideway comprising parallel slats held to move in the slideway, and a slotted deflector plate carried by the slats, the plate having inclined sides to shed cream and permit the admission of air, and thickened ends to which the slats are attached, substantially as described.

DANIEL A. FISKE.

Witnesses:
JAMES DOUGHTY,
G. W. SOWERS.